United States Patent
Linsky et al.

(10) Patent No.: US 9,119,215 B2
(45) Date of Patent: Aug. 25, 2015

(54) METHOD AND APPARATUS FOR ENHANCED PACKET TRAFFIC ARBITRATION

(75) Inventors: Joel B. Linsky, San Diego, CA (US); Anssi K. Haverinen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 12/838,614

(22) Filed: Jul. 19, 2010

(65) Prior Publication Data

US 2011/0051601 A1    Mar. 3, 2011

Related U.S. Application Data

(60) Provisional application No. 61/238,585, filed on Aug. 31, 2009.

(51) Int. Cl.
*H04J 3/14* (2006.01)
*H04W 74/08* (2009.01)
*H04L 12/40* (2006.01)
*H04L 12/407* (2006.01)
*H04L 12/54* (2013.01)

(52) U.S. Cl.
CPC ....... *H04W 74/085* (2013.01); *H04L 12/40006* (2013.01); *H04L 12/407* (2013.01); *H04L 12/40156* (2013.01); *H04L 12/5692* (2013.01)

(58) Field of Classification Search
CPC ...... G06F 13/38; G06F 13/28; H04W 74/085; H04L 12/40006; H04L 12/40156; H04L 12/407; H04L 12/5692
USPC ............................ 370/232, 329, 474; 455/296
See application file for complete search history.

(56) References Cited

U.S. PATENT DOCUMENTS

| 2007/0152812 | A1  | 7/2007  | Wong et al. |
| 2008/0200124 | A1* | 8/2008  | Capretta et al. ............... 455/41.3 |
| 2008/0310329 | A1* | 12/2008 | Sun et al. ........................ 370/280 |
| 2009/0116437 | A1* | 5/2009  | Alexandre et al. ............. 370/329 |
| 2009/0137206 | A1* | 5/2009  | Sherman et al. .............. 455/41.2 |

(Continued)

FOREIGN PATENT DOCUMENTS

| CN | 1617473 A    | 5/2005  |
| JP | 2004350098 A | 12/2004 |

(Continued)

OTHER PUBLICATIONS

Ahmed S I; Kwasniewski T A: "Overview of oversampling clock and data recovery circuits", Conference Proceedings Article, Electrical and Computer Engineering, 2005, Canadian Conference on Saskatoon, Canada, pp. 1876-1881, May 1, 2005, XP010869208.

(Continued)

*Primary Examiner* — Pao Sinkantarakorn
*Assistant Examiner* — Richard Chang
(74) *Attorney, Agent, or Firm* — Stanton Braden (57) ABSTRACT

A method and apparatus for enhanced packet traffic arbitration comprising conveying one or more of the following: a priority status, an operational status or a frequency status relating to a user device, wherein the conveying uses at least one scrambling code with good autocorrelation and cross-correlation properties and shares a single line shared multi-drop data bus; and commencing a slot timing for use by the user device.

36 Claims, 10 Drawing Sheets

(56) References Cited

U.S. PATENT DOCUMENTS

2009/0176454 A1    7/2009  Chen et al.
2009/0298530 A1*  12/2009  Armstrong ................. 455/553.1
2010/0079597 A1*   4/2010  Stokes et al. ................... 348/184

FOREIGN PATENT DOCUMENTS

| | | | |
|---|---|---|---|
| JP | 2006091955 | A | 4/2006 |
| JP | 2006197592 | A | 7/2006 |
| JP | 2010537449 | A | 12/2010 |
| WO | WO-2008042589 | A2 | 4/2008 |

OTHER PUBLICATIONS

International Search Report and Written Opinion—PCT/US2010/047707, International Search Authority—European Patent Office—Feb. 17, 2011.

Jansen Horst, Rotter Heinrich, "Informationstechnik und Telekommunikationstechnik", Jan. 1, 2003, Europa-Lehrmittel, Haan-Gruiten, XP002620448.

* cited by examiner

METHOD AND APPARATUS FOR ENHANCED PACKET TRAFFIC ARBITRATION

CLAIM OF PRIORITY UNDER 35 U.S.C. §119

The present application for patent claims priority to Provisional Application No. 61/238,585 entitled Method and Apparatus for Enhanced Packet Traffic Arbitration filed Aug. 31, 2009, and assigned to the assignee hereof and hereby expressly incorporated by reference herein.

FIELD

This disclosure relates generally to wireless communications. More particularly, the present disclosure relates to an enhanced packet traffic arbitration scheme among wireless communications systems such as, but not limited to, WiFi and Bluetooth.

BACKGROUND

In many communication systems, communications networks are used to exchange messages among several interacting nodes which are separated apart in space. There are many types of networks which may be classified in different aspects. In one example, the geographic scope of the network could be over a wide area, a metropolitan area, a local area, or a personal area, and the corresponding networks are designated as wide area network (WAN), metropolitan area network (MAN), local area network (LAN), or personal area network (PAN). Networks may also differ in the switching/routing technique used to interconnect the various network nodes and devices (e.g. circuit switching, packet switching, etc.), in the type of physical media employed for waveform propagation (e.g. wired vs. wireless), or in the set of communication protocols used (e.g. Internet protocol suite, SONET (Synchronous Optical Networking), Ethernet, wireless LAN protocols, etc.).

SUMMARY

Disclosed is a method and apparatus for enhanced packet traffic arbitration. According to one aspect, a method for enhanced packet traffic arbitration comprising conveying one or more of the following: a priority status, an operational status or a frequency status relating to a user device, wherein the conveying uses at least one scrambling code with good autocorrelation and cross-correlation properties and shares a single line shared multi-drop data bus; and commencing a slot timing for use by the user device.

According to another aspect, A user device comprising a processor and a memory, the memory containing program code executable by the processor for performing the following: conveying one or more of the following: a priority status, an operational status or a frequency status relating to a user device, wherein the conveying uses at least one scrambling code with good autocorrelation and cross-correlation properties and shares a single line shared multi-drop data bus; and commencing a slot timing for use by the user device.

According to another aspect, an apparatus for enhanced packet traffic arbitration comprising means for conveying one or more of the following: a priority status, an operational status or a frequency status relating to a user device, wherein the conveying uses at least one scrambling code with good autocorrelation and cross-correlation properties and shares a single line shared multi-drop data bus; and means for commencing a slot timing for use by the user device.

According to another aspect, A computer-readable medium storing a computer program, wherein execution of the computer program is for conveying one or more of the following: a priority status, an operational status or a frequency status relating to a user device, wherein the conveying uses at least one scrambling code with good autocorrelation and cross-correlation properties and shares a single line shared multi-drop data bus; and commencing a slot timing for use by the user device.

A potential advantage of the present disclosure includes improved wireless network response to packet traffic.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
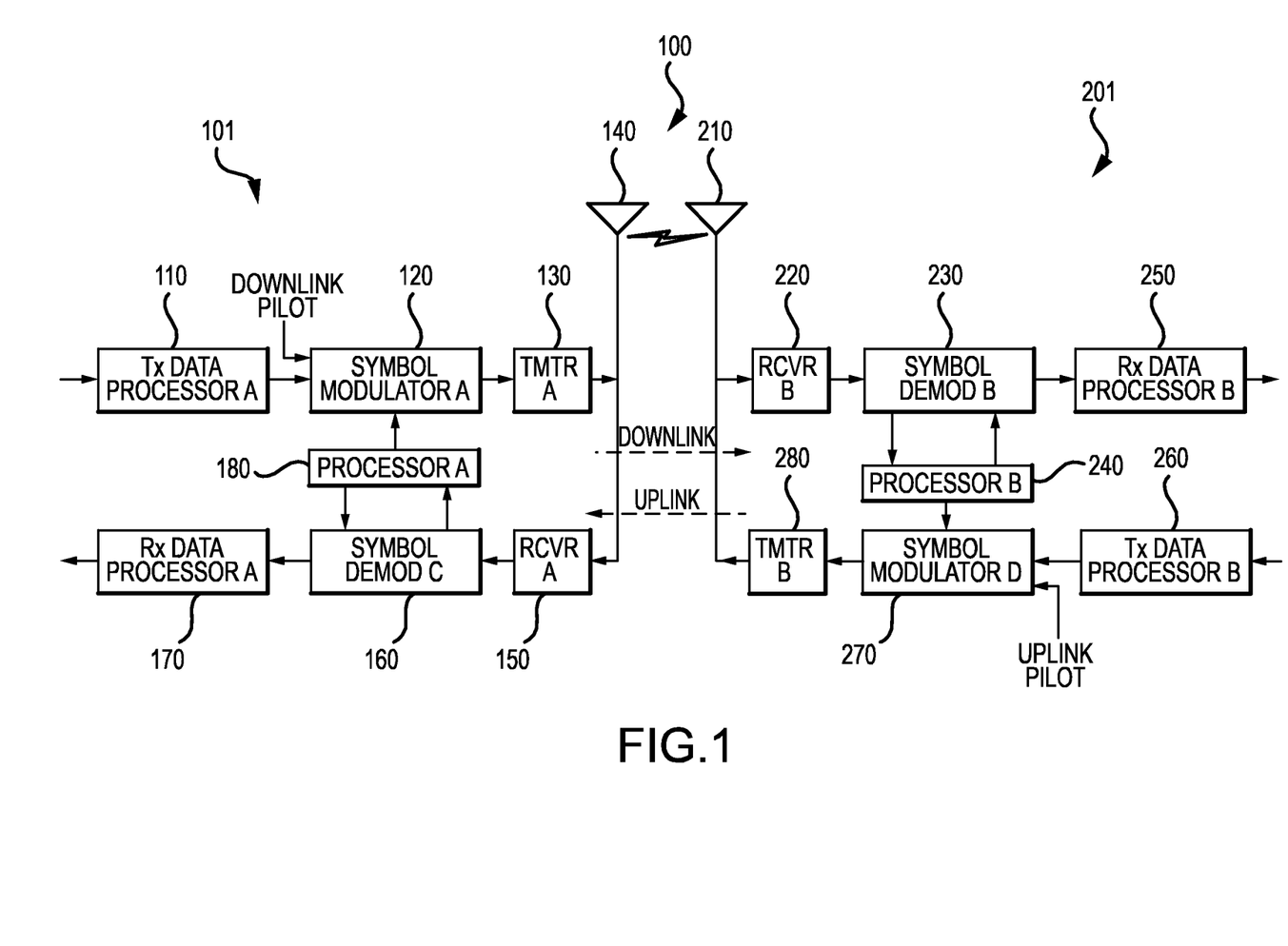
FIG. 1 is a block diagram illustrating an example of an access node/UE system.

FIG. 1 is a block diagram illustrating an example of an access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
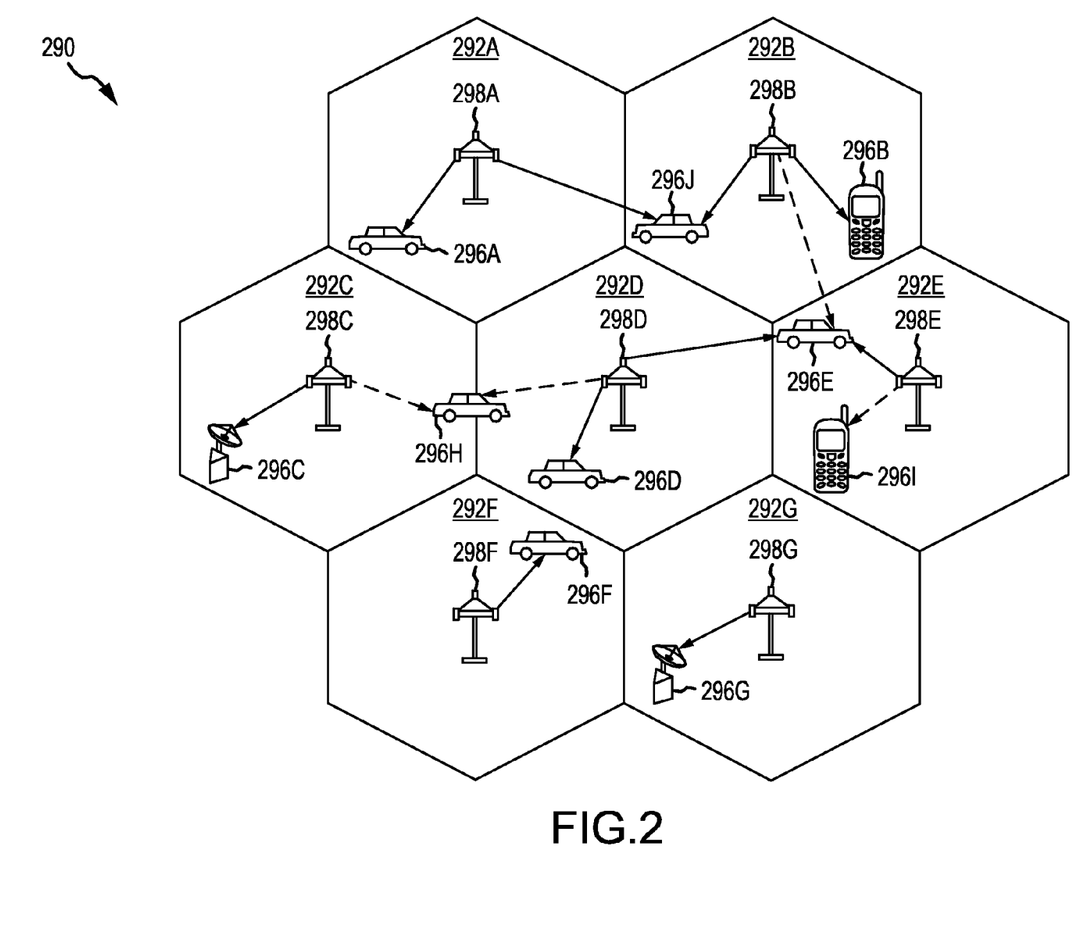
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

One important characteristic of communications networks is the choice of wired or wireless media for the transmission of electrical signals among the network nodes. In the case of wired networks, tangible physical media such as copper wire, coaxial cable, fiber optic cable, etc. are employed to propagate guided electromagnetic waveforms which carry message traffic over a distance. Wired networks are a traditional form of communications networks and may be favored for interconnection of fixed network elements or for bulk data transfer. For example, fiber optic cables are often the preferred transmission media for very high throughput transport applications over long distances between large network hubs, for example, bulk data transport across or between continents over the Earth's surface.

On the other hand, in many cases, wireless networks are preferred when the network elements are mobile with dynamic connectivity or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

For example, popular wireless network technologies include Bluetooth (BT) and wireless local area networks (WLAN). Bluetooth is a widely used wireless communications protocol to implement a personal area network (PAN) over very short distances, typically for a coverage area of a few meters radius, as an alternative to wired interconnection among local components. In one example, Bluetooth may be used to connect personal computers, personal digital assistants (PDA), mobile phones, wireless headsets, etc. Alternatively, a WLAN may be used to interconnect nearby devices together for both business and consumer applications, employing widely used networking protocols such as WiFi or, more generally, the IEEE 802.11 wireless protocol family, and connections between phones and laptops.

A consideration with wireless network technologies is that users often share the same radio frequency band in the same geographic area for transmission. Thus, co-channel interference is a problem that must be actively managed. For example, both Bluetooth and WLAN systems may use the same unlicensed Industrial, Scientific, and Medical (ISM) radio band centered near a frequency of 2.4 GHz. In one example, to save costs, a mobile device may share a common antenna which accesses both wireless technologies. To support user scenarios with simultaneous BT and WLAN operation, coexistence algorithms are required. Thus, a coexistence algorithm is needed to arbitrate usage between Bluetooth and WLAN access technologies for co-located wireless devices.

To mediate among co-existing wireless protocols, in one example, a coexistence mechanism is used. Coexistence mechanisms may be either collaborative, where information is shared between the communicating parties, or non-collaborative, where information is not shared. One collaborative coexistence mechanism is known as packet traffic arbitration (PTA). PTA typically uses the media access control (MAC) layer for traffic control.

In current wireless practice, packet traffic arbitration (PTA) protocol is used to implement coexistence among different access technologies. In one example, the PTA may be implemented through 2, 3, or 4 wire interfaces between BT and WLAN electronic chips in a wireless device. Each access technology makes channel requests for individual packets with an optional priority indication for that request. In one example, the arbitrator between the BT access technology and the WLAN technology operates at the medium access control (MAC) layer.

The PTA makes decisions on who gets access when both access technologies contend for a channel request simultaneously. This mechanism may prevent some collisions between the technologies for transmit traffic but does not prevent collisions between receive traffic. A collision is a conflict when two or more data sources attempt to transmit over the same medium at the same time.

PTA is typically implemented as a hardware interface and arbitration protocol within user devices between a WLAN module and a Bluetooth module, for example. In one example, the WLAN module and Bluetooth module are comprised of integrated circuits (ICs). The PTA typically comprises at least three signals:

BT_ACTIVE—asserted for transmission duration
BT_STATUS—indicates priority and direction of transmission
TX_CONFIRM—indicates if transmission can proceed in next slot
FREQ (Optional)—indicates the frequency status The PTA assumes in general that the WLAN module (e.g. WLAN IC) is the arbiter. Although PTA is a viable coexistence protocol, it has several limitations. For example, PTA requires three signals, it is not easily extendable, and it does not cover other wireless standards such as LTE or WiMax. PTA is a point-to-point protocol that does not scale up to support communication among more than two user devices in the system.

The present disclosure includes improvements to the PTA protocol. This improved protocol is called Enhanced PTA (ePTA). There are several requirements for ePTA to provide higher user satisfaction. In one aspect, a minimal (preferably one) off-chip input/output (I/O) interface is preferred. For example, a parallel digital interface for on-chip ePTA may be used for BT-WLAN integration. In another aspect, a larger information transfer is desired. For example, more bits should be allocated for radio activity, priority level, transmit/receive status, frame synchronization and frame utilization status, etc. This does not include RF sharing control bits (e.g. LNA gain, power amplifier setting, TX/RX switch control) since the power on reset (PoR) control is maintained by the BT/WLAN modules. In another aspect, the timing should be low latency (e.g. below 10 microseconds) for request or priority signals and have flexible response time. In one aspect, ePTA could replace the existing PTA protocol without loss of functionality or stricter timing requirements. Other desired attributes include multi-drop capability (e.g. BT, WLAN, and LTE/WiMax), functionality when one or more user device is asleep, avoiding waking up devices from sleep, and low power utilization.

Figure 3:
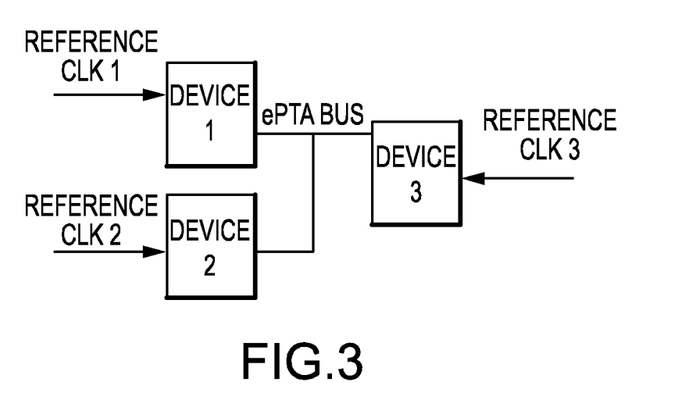
FIG. 3 illustrates an example of an ePTA system.

FIG. 3 illustrates an example of an ePTA system. Shown are three example devices each with their own reference clocks. In one aspect, reference clocks are used for synchronizing communication among the devices. The three devices are interconnected through an ePTA bus which is a single line shared multi-drop data bus. The ePTA bus is pulled high by all devices at all times, but driven low for transmission. The reference clocks are required to be active for the actively communicating devices. In one aspect, the reference clocks do not need to be balanced or the same frequency since the ePTA bus is oversampled. In one example, a single wire serial bus interface (SSBI) is not used since it is a point-to-point, synchronous protocol.

Figure 4:
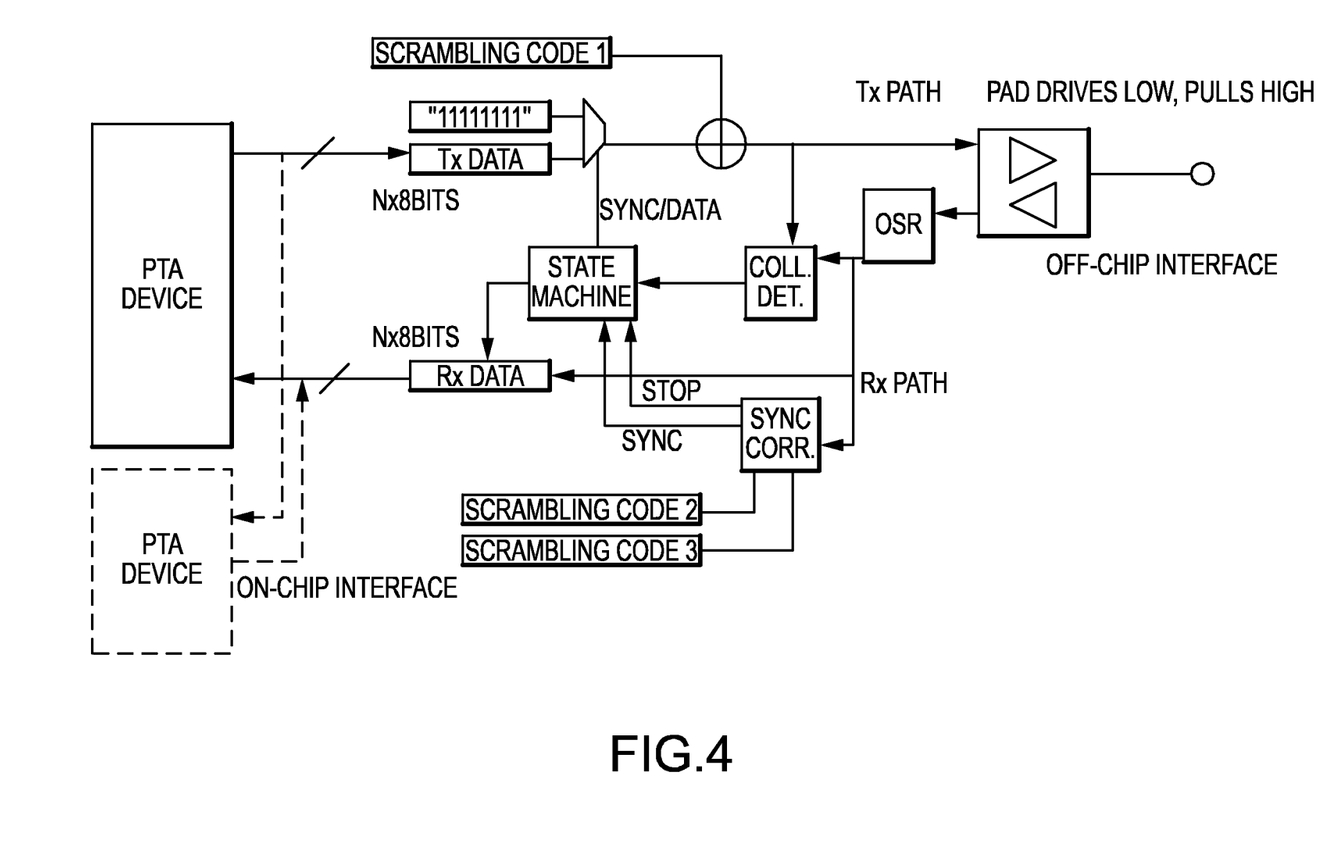
FIG. 4 illustrates an example of a physical interface for the ePTA system.

FIG. 4 illustrates an example of a physical interface for the ePTA system. In one example, scrambling codes are selected for good autocorrelation and cross-correlation properties. In one aspect, scrambling codes are used for device identification, initial synchronization, data whitening and collision detection. In one example, transmission starts with a sync byte (scrambled in hex format 0xFF) and terminates with a stop byte (unscrambled hex format 0xFF). Collision avoidance may be obtained via assigned device priority (e.g. back off time). When two devices are on the same die, direct (e.g. back office) connections are used instead.

Figure 5:
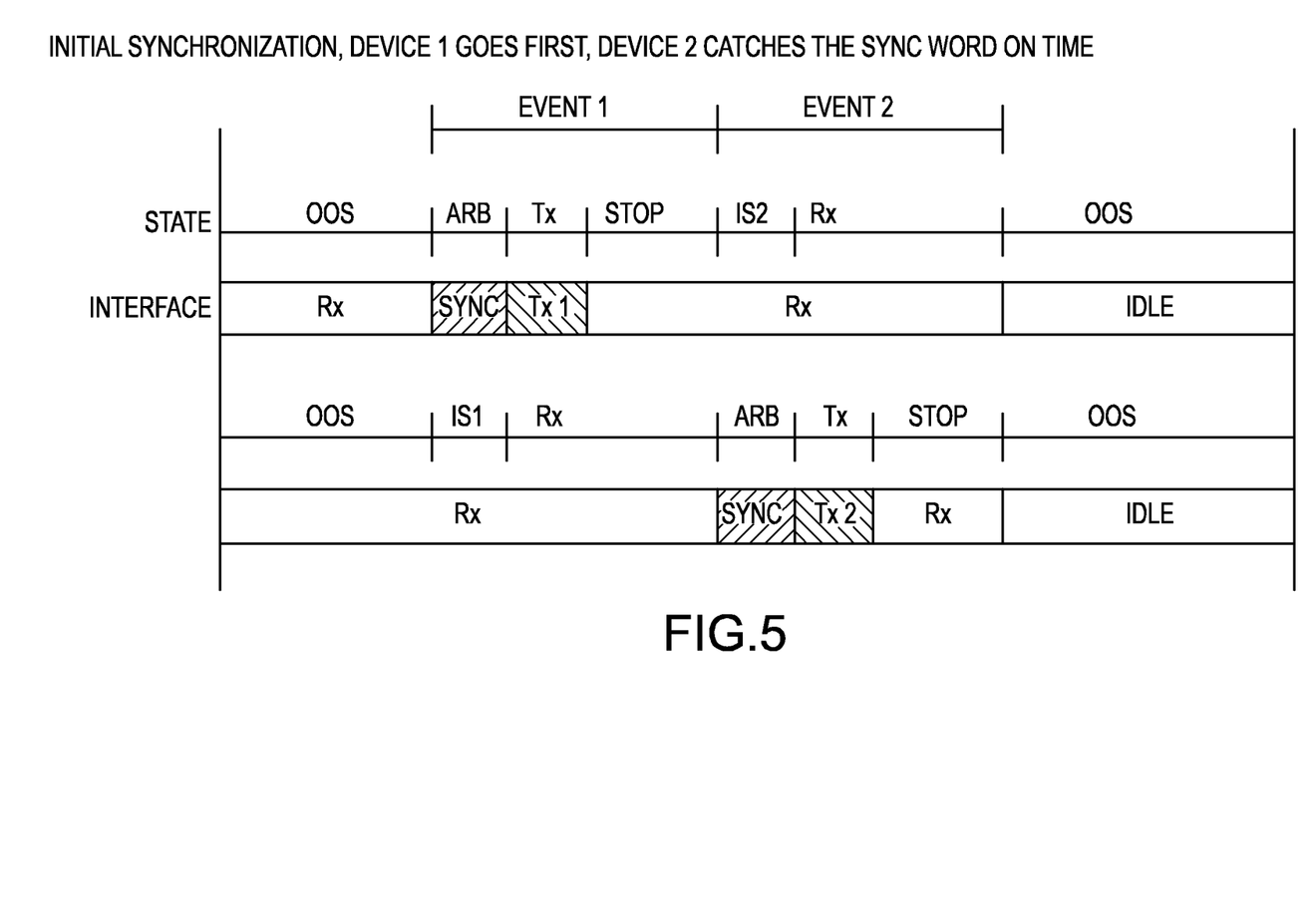
FIG. 5 illustrates an example of a signal timeline for two user devices.

FIG. 5 illustrates an example of a signal timeline for two user devices. In one example, the first device goes first after initial synchronization and the second device accepts the sync word on time.

Figure 6:
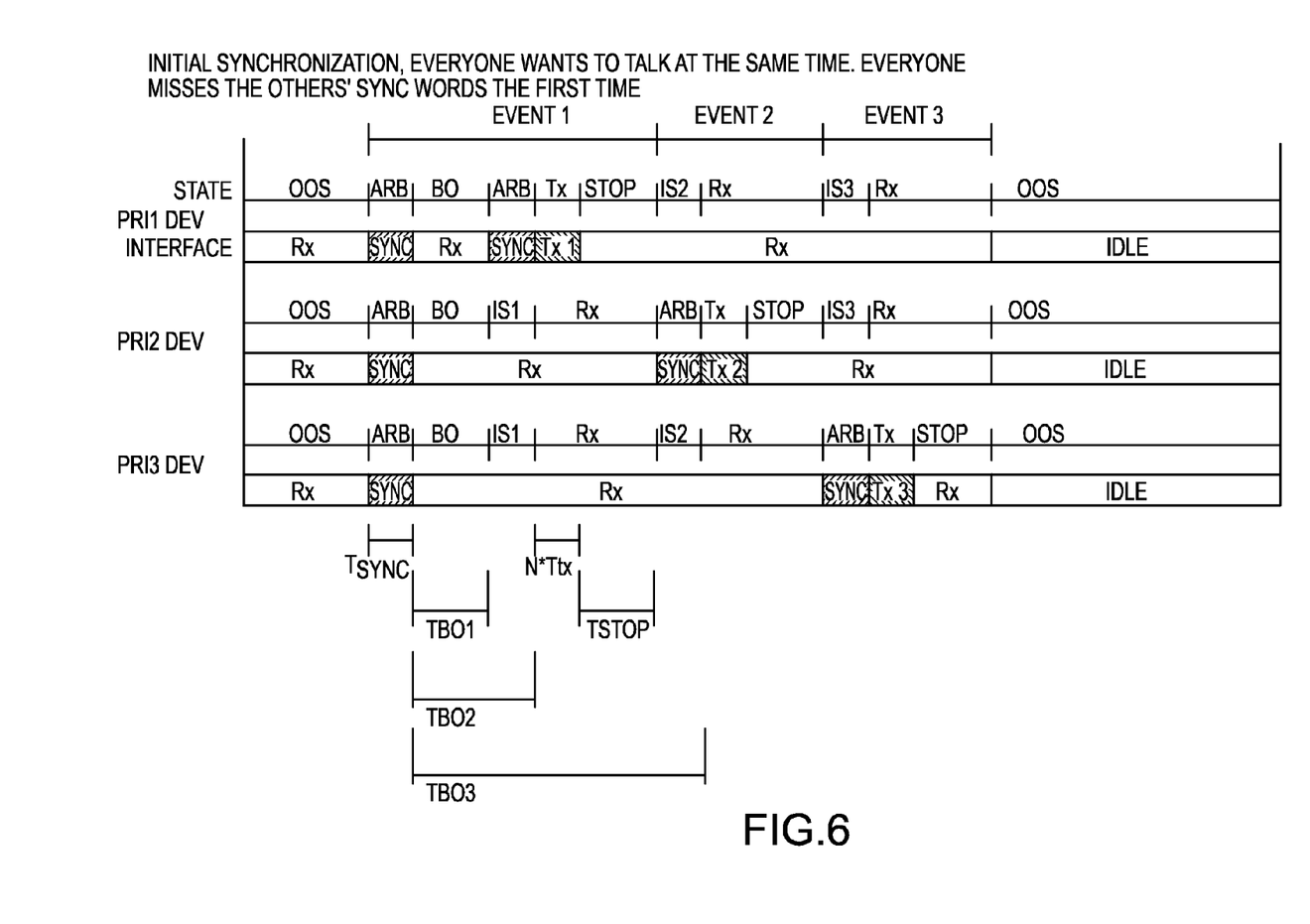
FIG. 6 illustrates an example of a signal timeline for three user devices.

FIG. 6 illustrates an example of a signal timeline for three user devices. In this example, all devices attempt to communicate at the same time after synchronization and all devices fail to accept the other's sync words the first time.

In one aspect, the protocol for data exchange depends on the access technology being used by each device. In one example, for Bluetooth (BT), a binary signal indicates if BT is active or not, a 3 bit signal indicates the BT priority state, another binary signal indicates the transmit/receive state, and another status signal indicates various other state variables such as frequency, etc. In another example, for WLAN (e.g. WiFi) a status signal indicates the grant state of the interface. In another example, for LTE/WiMax, a Frame_sync signal may be used by other access technologies for synchronization, a Frame_used signal may be used to indicate whether the current LTE/WiMax frame is being used or available for BT or WLAN to use, and a grant signal may be used to indicate if access is granted or not. In one example, a Bluetooth device requires good timing off of the Frame_sync signal for good utility. This may be achieved by having the Bluetooth device capture the Frame_sync clock when the initial request is low and then interrupt software if the Frame_sync bit is set.

Figure 7:
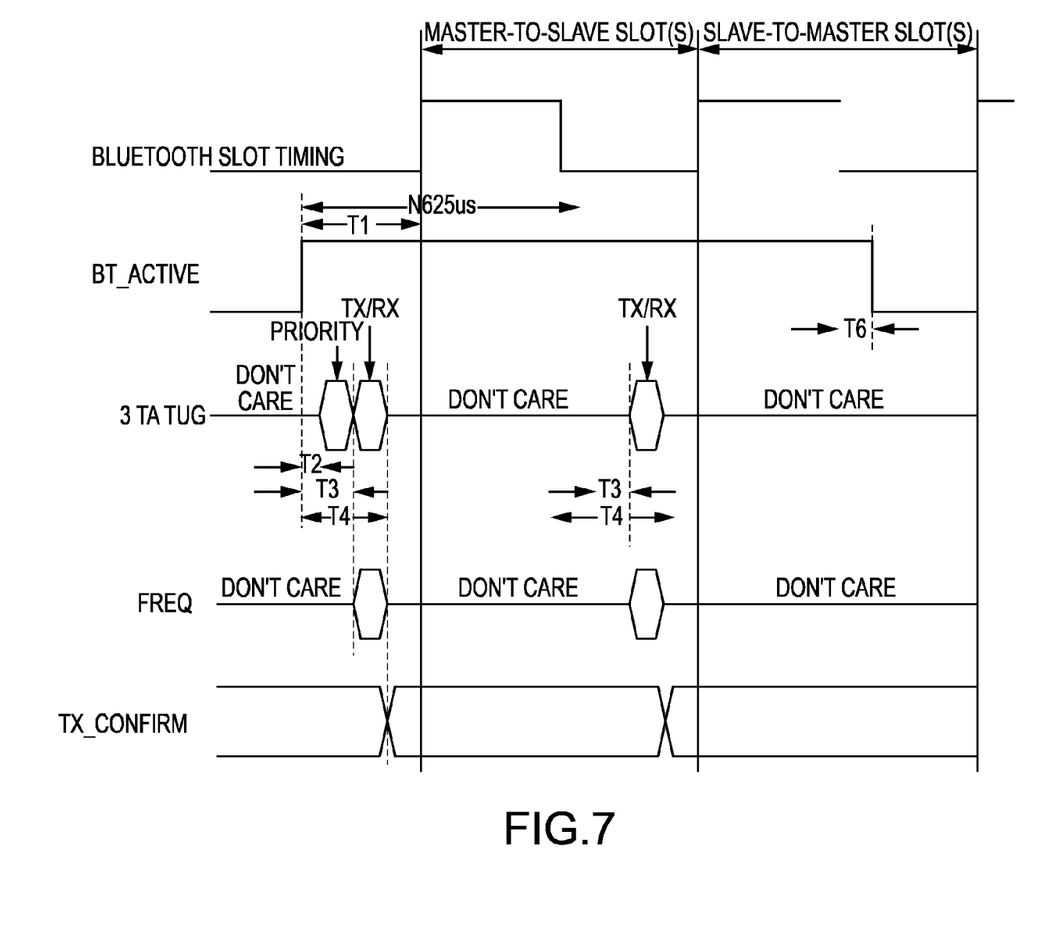
FIG. 7 illustrates an example of usage of an ePTA protocol as a replacement for the PTA protocol for packet traffic arbitration (PTA).

FIG. 7 illustrates an example of usage of an ePTA protocol as a replacement for the PTA protocol for packet traffic arbitration (PTA). In one aspect, the existing PTA signaling is replaced by 5 ePTA exchanges. Shown in FIG. 7 are the BT slot timing, BT_ACTIVE signal, BT_STATUS signal, FREQ status signal, and TX_CONFIRM signal.

Figure 8:
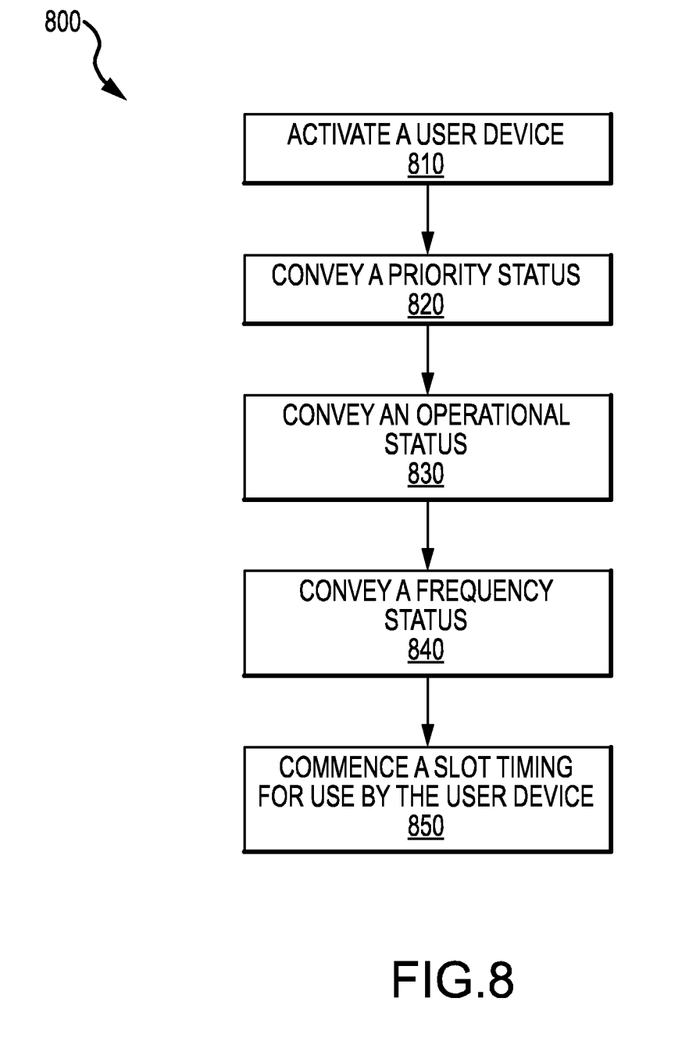
FIG. 8 illustrates an example flow diagram for enhanced packet traffic arbitration.

FIG. 8 illustrates an example flow diagram for enhanced packet traffic arbitration. In block 810, activate a user device. In one example, the user device is a Bluetooth device. In one example, the user device is activated by asserting a BT_ACTIVE signal HIGH. Following block 810, in block 820, convey a priority status. In one example, the priority status is that of a user device. In one example, the priority status is conveyed to a second user device, a base station, a network controller, a resource manager, etc. One skilled in the art would understand that the list of recipients of the priority status is not comprehensive or exclusive and that other recipients may be included without affecting the scope or spirit of the present disclosure.

In block 830, convey an operational status. In one example, the operational status is that of a user device. In one example, the operational status is a bilevel status indicating either the user device is in a transmit status or a receive status. In block 840, convey a frequency status. In one example, the frequency status is that of a user device.

In one aspect, one or more of the conveying steps in blocks 820, 830 or 840 uses at least one scrambling codes with good autocorrelation and cross-correlation properties. In one example, the scrambling codes are used for device identification, initial synchronization, data whitening and collision detection. For example, transmission starts with a sync byte (scrambled in hex format 0xFF) and terminates with a stop byte (unscrambled hex format 0xFF). Avoiding collision may be achieved by assigning device priority (e.g. back off time). In one aspect, the conveying steps in blocks 820, 830 and 840 all share a single line shared multi-drop data bus, for example, an ePTA bus. In one example, the single line shared multi-drop data bus is pulled high at all times, but driven low for transmission. In one example, the single line shared multi-drop data bus is oversampled.

One skilled in the art would understand that although the steps in blocks 820, 830 and 840 are written in a sequential manner and in a particular order, that the steps can be performed in a parallel manner and in any order of each other. Additionally, either the operational status or the frequency status may be conveyed to a second user device, a base station, a network controller, a resource manager, etc. One skilled in the art would understand that the list of recipients indicated herein is not comprehensive or exclusive and that other recipients may be included without affecting the scope or spirit of the present disclosure.

In block 850, commence a slot timing for use by the user device. In one example, the slot timing is a Bluetooth slot timing which operates between a HIGH state and a LOW state.

One skilled in the art would understand that the steps disclosed in the example flow diagram in FIG. 8 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
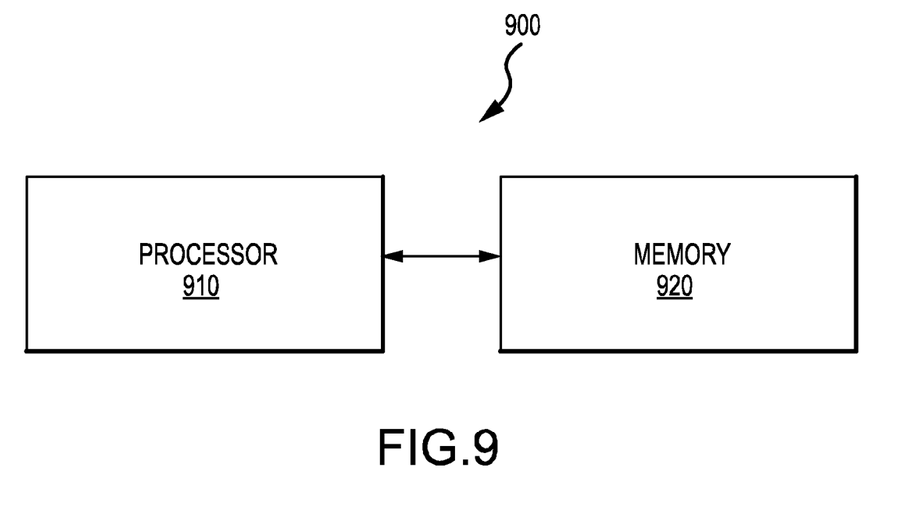
FIG. 9 illustrates an example of a device comprising a processor in communication with a memory for executing the processes for enhanced packet traffic arbitration.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 comprising a processor 910 in communication with a memory 920 for executing the processes for enhanced packet traffic arbitration. In one example, the device 900 is used to implement the algorithm illustrated in FIG. 8. In one aspect, the memory 920 is located within the processor 910. In another aspect, the memory 920 is external to the processor 910. In one aspect, the processor includes circuitry for implementing or performing the various flow diagrams, logical blocks and/or modules described herein.

Figure 10:
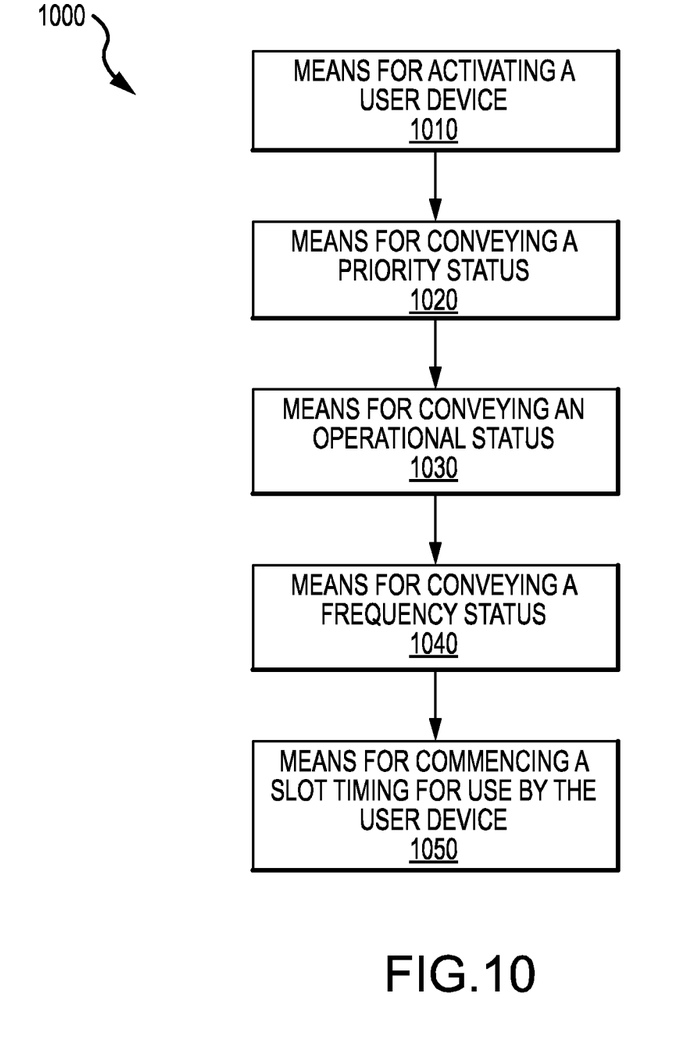
FIG. 10 illustrates an example of a device suitable for enhanced packet traffic arbitration.

FIG. 10 illustrates an example of a device 1000 suitable for enhanced packet traffic arbitration. In one aspect, the device 1000 is implemented by at least one processor comprising one or more modules configured to provide different aspects of enhanced packet traffic arbitration as described herein in blocks 1010, 1020, 1030, 1040 and 1050. For example, each module comprises hardware, firmware, software, or any combination thereof. In one aspect, the device 1000 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for enhanced packet traffic arbitration comprising:
   conveying one or more of the following: a priority status, an operational status or a frequency status relating to a user device, wherein the conveying uses at least one scrambling code with good autocorrelation and cross-correlation properties and shares a single line shared multi-drop data bus with conveyance of status relating to another user device; and
   commencing a slot timing for use by the user device.

2. The method of claim 1 wherein the at least one scrambling code is for one or more of the following: device identification, initial synchronization, data whitening, collision detection or collision avoidance.

3. The method of claim 1 further comprising avoiding collision by assigning device priority.

4. The method of claim 1 wherein the user device is a Bluetooth device.

5. The method of claim 1 wherein the user device is operationally compatible with one or more of the following: a WLAN system, a WiFi system, an IEEE 802.11 wireless system, a LTE system or a WiMax system.

6. The method of claim 3 wherein the single line shared multi-drop data bus is pulled high at all times and driven low during transmission.

7. The method of claim 4 wherein the Bluetooth device is activated by asserting a BT_ACTIVE signal HIGH.

8. The method of claim 6 wherein the transmission starts with a sync byte and terminates with a stop byte.

9. The method of claim 8 wherein the single line shared multi-drop data bus is oversampled.

10. The method of claim 9 wherein the single line shared multi-drop data bus is an ePTA bus.

11. A user device comprising a processor and a memory, the memory containing program code executable by the processor for performing the following:
conveying one or more of the following: a priority status, an operational status or a frequency status relating to the user device, wherein the conveying uses at least one scrambling code with good autocorrelation and cross-correlation properties and shares a single line shared multi-drop data bus with conveyance of status relating to another user device; and
commencing a slot timing for use by the user device.

12. The user device of claim 11 wherein the at least one scrambling code is for one or more of the following: device identification, initial synchronization, data whitening, collision detection or collision avoidance.

13. The user device of claim 11 wherein the memory further comprises program code for avoiding collision by assigning device priority.

14. The user device of claim 11 wherein the user device is a Bluetooth device.

15. The user device of claim 11 wherein the user device is operationally compatible with one or more of the following: a WLAN system, a WiFi system, an IEEE 802.11 wireless system, a LTE system or a WiMax system.

16. The user device of claim 13 wherein the single line shared multi-drop data bus is pulled high at all times and driven low during transmission.

17. The user device of claim 14 wherein the Bluetooth device is activated by asserting a BT_ACTIVE signal HIGH.

18. The user device of claim 16 wherein the transmission starts with a sync byte and terminates with a stop byte.

19. The user device of claim 18 wherein the single line shared multi-drop data bus is oversampled.

20. The user device of claim 19 wherein the single line shared multi-drop data bus is an ePTA bus.

21. An apparatus for enhanced packet traffic arbitration comprising:
means for conveying one or more of the following: a priority status, an operational status or a frequency status relating to a user device, wherein the conveying uses at least one scrambling code with good autocorrelation and cross-correlation properties and shares a single line shared multi-drop data bus with conveyance of status relating to another user device; and
means for commencing a slot timing for use by the user device.

22. The apparatus of claim 21 wherein the at least one scrambling code is for one or more of the following: device identification, initial synchronization, data whitening, collision detection or collision avoidance.

23. The apparatus of claim 21 further comprising means for avoiding collision by assigning device priority.

24. The apparatus of claim 21 wherein the apparatus is operationally compatible with one or more of the following: a WLAN system, a WiFi system, an IEEE 802.11 wireless system, a LTE system or a WiMax system.

25. The apparatus of claim 23 wherein the single line shared multi-drop data bus is pulled high at all times and driven low during transmission.

26. The apparatus of claim 25 wherein the transmission starts with a sync byte and terminates with a stop byte.

27. The apparatus of claim 26 wherein the single line shared multi-drop data bus is oversampled.

28. The apparatus of claim 27 wherein the single line shared multi-drop data bus is an ePTA bus.

29. A non-transitory computer-readable medium storing a computer program, wherein execution of the computer program is for:
conveying one or more of the following: a priority status, an operational status or a frequency status relating to a user device, wherein the conveying uses at least one scrambling code with good autocorrelation and cross-correlation properties and shares a single line shared multi-drop data bus with conveyance of status relating to another user device; and
commencing a slot timing for use by the user device.

30. The computer-readable medium of claim 29 wherein the at least one scrambling code is for one or more of the following: device identification, initial synchronization, data whitening, collision detection or collision avoidance.

31. The computer-readable medium of claim 29 wherein execution of the computer program is also for avoiding collision by assigning device priority.

32. The computer-readable medium of claim 29 wherein execution of the computer program is operationally compatible with one or more of the following: a WLAN system, a WiFi system, an IEEE 802.11 wireless system, a LTE system or a WiMax system.

33. The computer-readable medium of claim 31 wherein the single line shared multi-drop data bus is pulled high at all times and driven low during transmission.

34. The computer-readable medium of claim 33 wherein the transmission starts with a sync byte and terminates with a stop byte.

35. The computer-readable medium of claim 34 wherein the single line shared multi-drop data bus is oversampled.

36. The computer-readable medium of claim 35 wherein the single line shared multi-drop data bus is an ePTA bus.

* * * * *